April 8, 1930. J. L. MATABON ET AL 1,754,029
POWER FACTOR CONTROL OF ALTERNATING CURRENT ASYNCHRONOUS MACHINES
Filed Sept. 18, 1925
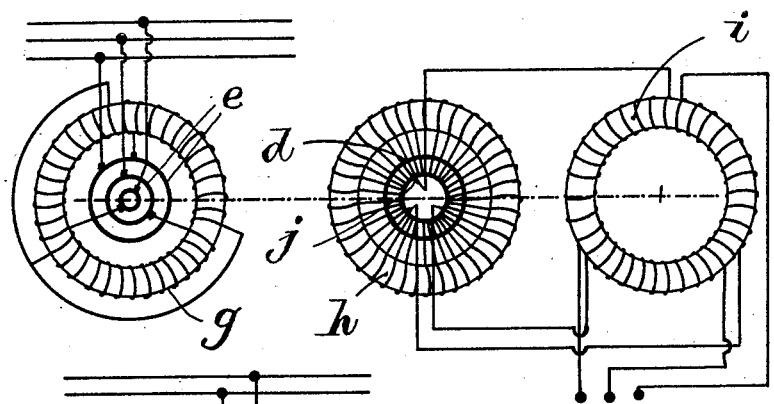
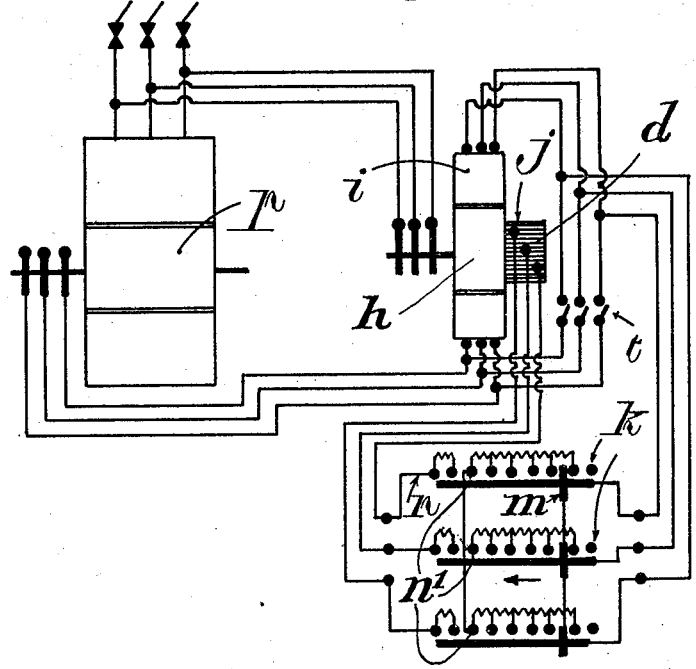
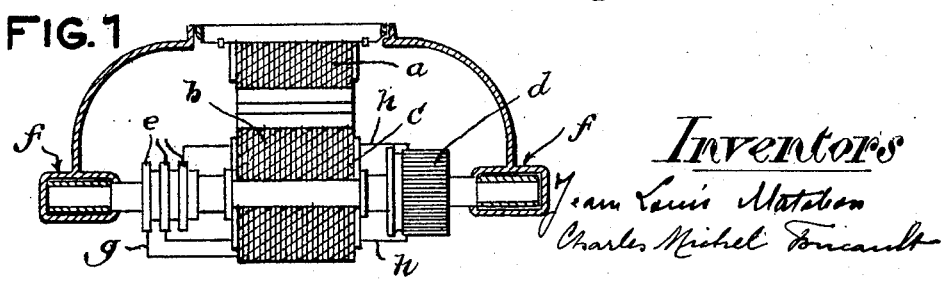
Inventors
Jean Louis Matabon
Charles Michel Foucault Patented Apr. 8, 1930

1,754,029

UNITED STATES PATENT OFFICE

JEAN LOUIS MATABON AND CHARLES MICHAEL FOUCAULT, OF LYON, FRANCE

POWER-FACTOR CONTROL OF ALTERNATING-CURRENT ASYNCHRONOUS MACHINES

Application filed September 18, 1925, Serial No. 57,116, and in France September 20, 1924.

The present invention has for its object an apparatus for the individual compensation of the power factor of asynchronous ring machines.

This apparatus comprises essentially a polyphase current exciter only requiring an electrical connection with the principal motor no mechanical connections being necessary.

This exciter allows of compensating the power factor in machines with a wound rotor and provided with rings whether they be in service or not. Its characteristics of working are the following:

1. The exciter allows of the compensation of the power factor without any mechanical modification of the motor as it exists and which remains asynchronous; a very simple transformation of the apparatus is sufficient.

2. It nullifies the dewatted current of the motor to which it is adapted, that is to say it allows of the realization of a power factor approaching unity between a zero load and a load amounting to from 5/4ths to 6/4ths of the normal load, as far as the heating of the machine to be compensated will allow of it, or the mechanical power furnished thereby.

3. It is self compensating, that is to say it absorbs the power necessary to its action at a power factor which is practically equal to unity at all loads.

4. It is self motive and does not require the motor to drive it, nor any mechanical connection (such as belts, cables, gears, clutch sleeves or the like) with the motor to be compensated; the simple electrical connection necessary to obtain the compensation is obtained very easily.

Furthermore, the motor provided with this exciter possesses all the properties of a compensated motor and, in particular, its maximum running torque or slow down couple is augmented.

The device may be added to all asynchronous motors with a polyphase secondary, whatever be the number of phases of the main which supplies it.

The working characteristics of the exciter are determined by the fact that the apparatus operates simultaneously:

1. As a motor,
2. As a transformer of power,
3. As a transformer of frequency,
4. As a phase shifter.

This device for the individual compensation of asynchronous ring motors is in the form of an exciter whose secondary winding is coupled in series with the secondary of the principal machine to be compensated (or else coupled in parallel).

The accompanying drawing represents diagrammatically, by way of example, various applications of the compensating device which forms the subject matter of the present invention:

Figure 1 is a partial longitudinal section of the exciter, for an asynchronous machine.

Figure 2 is a diagram of the windings and the electrical connections to be made in the case of a bi-polar exciter, a triphase main and a secondary triphased on to the machine to be compensated (series coupling).

Figure 3 shows the connections to be made between the motor to be compensated, the exciter and the starter.

The machine comprises a stator $a$ and a rotor $b$ of thin sheets of silicon iron, such as are used in electrical constructions, and which are insulated from each other by paper or by varnish or by any well known process, and mounted under pressure as in asynchronous machines of the usual construction. The stator and the rotor are slotted, one at its internal periphery and the other at its external periphery and are separated by a small gap. The rotor is mounted on a shaft $c$ which carries also keyed upon it, a commutator of the segment type $d$ of the kind used in continuous current machines; and a ring collector $e$ of the type usually employed. The two commutators may be arranged on the same side of the rotor, or on either side. They are driven by said rotor the shaft of which is adapted to rotate in fixed bearings $f$ rigidly connected to the stator by means of bearing bases fitted into and fixed to the body carrying the ironwork.

In certain cases the bearings may be supported by independent bearings fixed to the same base plate or the same seat as the body carrying the ironwork of the stator.

The rotor is provided with two separate windings housed in the same slots and superposed to facilitate winding. In certain cases separated slots may be provided for either one or other of the two windings.

One of the windings $g$ of the rotor (see Figure 2) which we term the "normal primary winding", is connected to the slip rings on which the brushes which are connected to the mains rub; this winding is of the usual type employed in alternating current mono or polyphase machines, and may be formed by winding wire on the rotor or by dropping prepared groups of bars into rotor-slots and making suitable end connections. The auxiliary winding $h$ of the rotor is connected to the commutator $d$ and is of the type known as the closed type commonly used in continuous current machines, the pitch being normal or short.

The secondary winding $i$ of the stator, is of the type used in polyphase alternating current machines and should have the same number of phases as the secondary winding of the machine to be compensated as well as the winding $h$ or primary winding of the rotor of the exciter.

The primary normal winding $g$ is mono, di, tri or $n$ phased according to the number of phases of the supply mains.

On the commutator $d$ rest the brushes $j$ the number of lines and the angular separation of which are determined by the number of phases common to the secondary winding of the motor to be compensated, the auxiliary winding $h$ of the exciter and the motor and compensator secondary winding $i$ of the exciter also by the number of poles of the exciter, the type of winding employed and the possible utilization of equalizers.

The dephasage of the tensions is introduced by the shifting of the brushes $j$ bearing on the commutator of the segment type $d$ and which for certain fixed and well determined positions, must give the maximum compensation both on the exciter and on the machine to be compensated; these positions being different in principle according to the direction of rotation of the exciter. The number of poles of the exciter and therefore its speed is independent of the number of poles of the machine to be compensated. In certain cases the winding of the rotor of the main asynchronous induction motor to be compensated may be used as a primary winding, and that of the stator as secondary winding which may be advantageous according to the degree of compensation to be effected.

With a suitable exciting tension and with the brushes $j$ suitably set it is possible to obtain if the principal machine allows of it a compensation comparable to that obtained in a self compensated shunt motor and to also obtain on the machines, but without having altered the principal motor in any way, a power factor approaching unity between a zero load and a load equal to from 5/4ths to 6/4ths of the normal load. The compensation which is the maximum under no load, varies very little with the load which is not produced in synchronous machines unless a complicated regulator be used. The fixed setting of the brushes corresponds to the production of a potential impressed on the secondary winding of the exciter dephased 90° electrical on the tension of slip.

Under no load the speed of the principal machine and the exciter is that of syncronism. For the fixed setting of the brushes, indicated above the tension between them is absolutely determined and is a function of the mains tension.

Figure 3 shows a modification of assemblage in which the apparatus is considerably simplified. In view of its low power relatively to the principal motor the exciter may then be started with its secondary winding $i$ short circuited on the commutator $d$ of the segment type.

When running normally the exciter must have a positive slip that is to say it works as an asynchronous generator on the side of the ring commutator the secondary of the principal motor furnishing then the power necessary for its working.

With an excitation tension and the brushes $j$ correctly set, it is possible to effect compensation analogous to that which can be obtained by using a shunt exciter.

What we claim as our invention and desire to secure by Letters Patent of the United States is:—

In combination, an asynchronous wound rotor machine, apparatus for the compensation of the power factor of said machine, comprising an exciter having no mechanical connection with the machine to be compensated, fixed brushes on the commutator of said exciter adapted to impress an E. M. F. on the secondary of the said machine, the exciter having a rotor with two distinct windings, one of normal type for alternating currents connected to slip rings, the other of the closed type connected to the said commutator, and a stator having a winding of normal type for polyphase alternating currents connected in series with the secondary of the said machine and to the said brushes, whose adjustment is such that the tension impressed on the secondary winding of the exciter is dephased 90° in advance of the slip tension in said winding, a starting rheostat inserted in the secondary circuit of the said machine and in the circuit of the exciter for the purpose of starting said machine as a normal asynchronous motor, compensation terminals on said rheostat connected to the said brushes for operating said machine as a compensated asynchronous motor, and a switch for starting the exciter in short circuit and putting it into normal running when open.

In witness whereof we have signed this specification.

JEAN LOUIS MATABON.
CHARLES MICHAEL FOUCAULT.